United States Patent
Lu et al.

(10) Patent No.: US 10,869,293 B2
(45) Date of Patent: Dec. 15, 2020

(54) POSITIONING CYCLE ADJUSTMENT METHOD AND APPARATUS

(71) Applicant: Huawei Technologies Co., Ltd., Shenzhen (CN)

(72) Inventors: Henghui Lu, Beijing (CN); Fan Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/464,918

(22) PCT Filed: Nov. 30, 2016

(86) PCT No.: PCT/CN2016/108111
§ 371 (c)(1),
(2) Date: May 29, 2019

(87) PCT Pub. No.: WO2018/098717
PCT Pub. Date: Jun. 7, 2018

(65) Prior Publication Data
US 2020/0015190 A1 Jan. 9, 2020

(51) Int. Cl.
*H04W 64/00* (2009.01)
*H04B 17/318* (2015.01)
*H04W 4/029* (2018.01)
*H04W 4/80* (2018.01)
*H04W 24/08* (2009.01)
*H04W 52/02* (2009.01)

(52) U.S. Cl.
CPC ........ *H04W 64/006* (2013.01); *H04B 17/318* (2015.01); *H04W 4/029* (2018.02); *H04W 4/80* (2018.02); *H04W 24/08* (2013.01); *H04W 52/0261* (2013.01)

(58) Field of Classification Search
CPC ..... H04W 64/006; H04W 4/029; H04W 4/80; H04W 24/08; H04W 52/0261; H04B 17/318

See application file for complete search history.

(56) References Cited

U.S. PATENT DOCUMENTS

| 9,661,484 | B2 * | 5/2017 | Smith ................. H04L 65/1006 |
| 2010/0045519 | A1 | 2/2010 | Lee |
| 2013/0147668 | A1 | 6/2013 | Kung et al. |
| 2019/0107631 | A1 * | 4/2019 | Ische ....................... G01S 19/48 |
| 2019/0200318 | A1 * | 6/2019 | Wirola .................... G01S 5/021 |

FOREIGN PATENT DOCUMENTS

| CN | 1859798 A | 11/2006 |
| CN | 100428862 C | 10/2008 |
| CN | 101730204 A | 6/2010 |
| CN | 102076082 A | 5/2011 |
| CN | 103167523 A | 6/2013 |
| CN | 103402176 A | 11/2013 |
| CN | 104359480 A | 2/2015 |
| WO | 2016083769 A1 | 6/2016 |

* cited by examiner

*Primary Examiner* — Wayne H Cai
(74) *Attorney, Agent, or Firm* — Slater Matsil, LLP

(57) ABSTRACT

A positioning cycle adjustment method comprising: obtaining, by a mobile device, a group of environment record information in a current environment; determining, by the mobile device, a location change rate value of the mobile device based on obtained N groups of environment record information, where N is greater than or equal to 2; and then adjusting a positioning cycle of the mobile device based on the determined location change rate value.

15 Claims, 5 Drawing Sheets

POSITIONING CYCLE ADJUSTMENT METHOD AND APPARATUS

CROSS-REFERENCE TO RELATED APPLICATIONS

This application is a national phase filing under section 371 of PCT/CN2016/108111, filed Nov. 30, 2016, which is hereby incorporated herein by reference.

TECHNICAL FIELD

The present invention relates to the communications field, and in particular, to a positioning cycle adjustment method and apparatus.

BACKGROUND

With development of technologies, a location based service (English full name: Location Based Service, LBS) becomes an indispensable function of a mobile device. Because positioning power consumption is relatively high, reducing the positioning power consumption has become a key issue that restricts development and popularization of many LBS applications.

In the prior art, a positioning cycle is adjusted based on a distance between a mobile device and a destination, or a movement direction and a movement distance within a specific time period, so as to reduce positioning power consumption. For example, when the mobile device is relatively far away from the destination, a long positioning cycle is set; or when the mobile device is relatively close to the destination, a short positioning cycle is set. Alternatively, when the movement direction indicates that the mobile device moves towards the destination and the movement distance within the specific time period is greater than a specified positioning service quality precision requirement, the positioning cycle is shortened; or when the movement direction indicates that the mobile device moves away from the destination, the positioning cycle is prolonged.

The foregoing positioning cycle adjustment process can be implemented only when the destination is known, and is not applicable to a scenario in which the destination is not limited. For example, in a child/senior tracking care application, a user needs to know only location information of the child/senior, without needing to set a destination for the child/senior. In addition, the distance to the destination, the movement direction, and the movement distance are usually calculated based on a positioning technology or a motion sensor. As a result, not only accuracy is limited by precision of the positioning technology or the motion sensor, but also extra power consumption is caused.

SUMMARY

Embodiments of the present invention provide a positioning cycle adjustment method and apparatus, so as to precisely adjust a positioning cycle in various scenarios, and better reduce positioning power consumption.

The following technical solutions are used in the embodiments of the present invention to achieve the foregoing objective.

According to a first aspect of this application, a positioning cycle adjustment method is provided, applied to a positioning process of a mobile device, so as to adjust a positioning cycle of the mobile device. The method specifically includes: obtaining, by the mobile device, a group of environment record information in a current environment, where the environment record information includes a received signal strength (English full name: Received Signal Strength, RSS) of an environment signal, a receiving time of the environment signal, and an information source identifier of the environment signal in the current environment; determining, by the mobile device, a location change rate value of the mobile device based on obtained N groups of environment record information, where the location change rate value reflects a location change distance of the mobile device per unit of time, and N is greater than or equal to 2; and then adjusting, by the mobile device, a positioning cycle of the mobile device based on the determined location change rate value.

Therefore, the mobile device may adjust the positioning cycle of the mobile device based on the location change rate value after the mobile device obtains the environment record information in the current environment and further obtains the location change rate value. To adjust the positioning cycle, there is no need to know a destination of the mobile device, and an application scenario is not limited. The positioning cycle can be adjusted in various scenarios by using the solutions of this application. Further, according to the positioning cycle adjustment solution in this application, the RSS of the existing environment signal is used without extra power consumption of the mobile device, so that power consumption of the mobile device is lower. In addition, positioning cycle adjustment precision is improved because no positioning is required.

With reference to the first aspect, in a possible implementation, the environment signal includes but is not limited to at least one of the following signals that can be detected by the mobile device: a cellular signal, a Wireless Fidelity (English full name: Wireless Fidelity, WIFI) signal, a Bluetooth signal, an optical signal, and a geomagnetic field signal. Various environment signals are used to implement the solution of the first aspect, to achieve a beneficial effect of the first aspect.

It should be noted that a type of the environment signal may be configured based on an actual requirement. The type of the environment signal is not specifically limited in this application. Any signal that can be used to estimate the location change rate value of the mobile device can be used as the environment signal.

With reference to either the first aspect or the foregoing possible implementation, in another possible implementation, the determining, by the mobile device, a location change rate value of the mobile device based on obtained N groups of environment record information may specifically include: calculating, by using a quantity of information sources that generate the environment signal as a dimension of the N groups of environment record information and using the environment record information as a location point of the mobile device, a distance between location points of the mobile device that are corresponding to the N groups of environment record information; and then dividing the calculated distance by a receiving time difference between an environment signal with an earliest receiving time and an environment signal with a latest receiving time in the N groups of environment record information, to obtain the location change rate value of the mobile device. Therefore, a specific solution for determining, by the mobile device, the location change rate value of the mobile device based on the obtained N groups of environment record information is provided. The distance between the N groups of environment record information is used as a measurement of a location change magnitude of the mobile device and is divided by a receiving time interval of the environment signal in the N groups of environment record information. The location change rate value similar to a rate magnitude is used to reflect a location change speed of the mobile device. Then the positioning cycle can be accurately adjusted based on the location change rate value.

With reference to any one of the first aspect and the foregoing possible implementations, in another possible implementation, a plurality of implementations for calculating the distance between the N groups of environment record information based on different values of N are provided. The implementations may specifically include: if N is equal to 2, calculating a distance between location points of the mobile device that are corresponding to two groups of environment record information; or if N is greater than 2, calculating a distance between location points of the mobile device that are corresponding to environment record information of the environment signal with the earliest receiving time and environment record information of the environment signal with the latest receiving time in the N groups of environment record information, and using the distance as the distance between the location points of the mobile device that are corresponding to the N groups of environment record information; or if N is greater than 2, separately calculating a distance between location points of the mobile device that are corresponding to two groups of environment record information of two environment signals with adjacent receiving time in the N groups of environment record information, and averaging obtained N−1 distances to obtain the distance between the location points of the mobile device that are corresponding to the N groups of environment record information.

With reference to any one of the first aspect and the foregoing possible implementations, in another possible implementation, when the mobile device determines the location change rate value of the mobile device based on the obtained N groups of environment record information, the distance may be calculated in a plurality of distance calculation manners. For example, when the mobile device determines the location change rate value of the mobile device based on the obtained N groups of environment record information, the distance between the location points of the mobile device that are corresponding to the N groups of environment record information may be calculated by calculating a Euclidean distance, a standardized Euclidean distance, a Manhattan distance, or a Chebyshev distance or by using another distance-based calculation method. Certainly, there may be other distance calculation methods, which are not listed herein. This is not specifically limited in this application.

With reference any one of to the first aspect and the foregoing possible implementations, in another possible implementation, the value of N may be determined based on an actual requirement and may be set to a fixed value. Alternatively, the value of N may be set to an initial value based on an actual requirement. In a positioning process of the mobile device, the value of N is adaptively adjusted based on the location change rate value of the mobile device. For example, when the location change rate value of the mobile device increases, the value of N decreases accordingly; or when the location change rate value of the mobile device decreases, the value of N increases accordingly. Certainly, a correspondence between the location change rate value of the mobile device and N may be set based on an actual requirement. This is not specifically limited in this application.

With reference to any one of the first aspect and the foregoing possible implementations, in another possible implementation, a Euclidean distance between first environment record information and second environment record information is calculated as:

$$d_{12} = \sqrt{\sum_{k=1}^{M} (RSS_{1k} - RSS_{2k})^2}.$$

$RSS_{1k}$ is an RSS of an environment signal generated by a $k^{th}$ information source in the first environment record information, and $RSS_{2k}$ an RSS of an environment signal generated by a $k^{th}$ information source in the second environment record information.

With reference to any one of the first aspect and the foregoing possible implementations, in another possible implementation, before the calculating a distance between location points of the mobile device that are corresponding to the N groups of environment record information, the method may further include: if the first environment record information includes an RSS of an environment signal generated by a first information source, and the second environment record information does not include the RSS of the environment signal generated by the first information source, assigning, in the second environment record information, a predetermined value to the RSS of the environment signal generated by the first information source. The first environment record information and the second environment record information are two groups of environment record information that are used to calculate the distance in the N groups of environment record information. In this way, even though quantities of RSSs included in environment record information of environment signals detected at different moments are different, the solutions of this application can be completed, to achieve the beneficial effect of the first aspect.

It should be noted that a specific value of the predetermined value may be set based on an actual requirement. This is not specifically limited in this application.

With reference to any one of the first aspect and the foregoing possible implementations, in another possible implementation, another implementation in which the mobile device determines the location change rate value of the mobile device based on the obtained N groups of environment record information is provided. The implementation specifically includes: extracting characteristic values of the N groups of environment record information; and inputting the characteristic values of the N groups of environment record information into a training model, to obtain a location change rate value that is output by the training model, and using the location change rate value as the location change rate value of the mobile device. The characteristic value is a value that can be identified by the training model, and the training model is used to obtain, based on an input characteristic value of environment record information, a location change rate value corresponding to the input environment record information. Therefore, a feature of the location change rate value can be quickly obtained by using the training model. The characteristic value of the detected environment record information is directly input into the training model to quickly obtain the location change rate value of the mobile device, so that processing efficiency is improved.

The characteristic value of the environment record information may include but is not limited to a Euclidean distance of the environment record information, a mean value of the environment record information, a variance of the environment record information, or another value. A type of the characteristic value of the environment record information is not specifically limited in this application.

With reference to any one of the first aspect and the foregoing possible implementations, in another possible implementation, if the location change rate value of the mobile device is obtained by using the training model, the training model needs to be established before the mobile device obtains the location change rate value of the mobile device based on the N groups of environment record information. During establishment of the training model, training data is first obtained. The training data includes the environment record information and a location change rate. Then a mapping relationship between the environment record information (abstracted as a feature) and the location change rate is established by using a machine learning algorithm, so as to obtain the training model. The training data may be obtained by using a global positioning system (English full name: Global Positioning System, GPS) or in another manner. Obtaining of the training data is not limited in this application. A training model establishment process is not described in detail either.

With reference to any one of the first aspect and the foregoing possible implementations, in another possible implementation, a specific implementation in which the mobile device adjusts the positioning cycle of the mobile device based on the location change rate value is provided, including: adjusting the positioning cycle of the mobile device to a positioning cycle corresponding to the determined location change rate value of the mobile device in a preset correspondence. The preset correspondence includes at least one location change rate value and a positioning cycle that is in a one-to-one correspondence with the at least one location change rate value.

Specifically, in the preset correspondence, a relatively large location change rate value corresponds to a relatively short positioning cycle, and a relatively small location change rate value corresponds to a relatively long positioning cycle. A correspondence between the location change rate value and the positioning cycle in the preset correspondence is not specifically limited in this application.

With reference to any one of the first aspect and the foregoing possible implementations, in another possible implementation, after the determining, by the mobile device, a location change rate value of the mobile device based on obtained N groups of environment record information, the method may further include: determining whether a difference between the currently determined location change rate value of the mobile device and a previous location change rate value of the mobile device is greater than or equal to a preset threshold. A specific implementation in which the mobile device adjusts the positioning cycle of the mobile device based on the location change rate value is: adjusting, by the mobile device, the positioning cycle of the mobile device based on the location change rate value if the difference is greater than or equal to the preset threshold. Therefore, the positioning cycle of the mobile device is adjusted only when the difference between the location change rate value of the mobile device and the previous location change rate value of the mobile device is greater than or equal to the preset threshold. In this way, positioning cycle adjustment better meets an actual requirement, and resource waste of the mobile device that is caused by frequent adjustment to the positioning cycle when the mobile device moves slowly is avoided.

It should be noted that a value of the preset threshold may be set to any value greater than or equal to o based on an actual requirement. This is not specifically limited in this application.

With reference to any one of the first aspect and the foregoing possible implementations, in another possible implementation, if it is determined that the difference between the determined location change rate value of the mobile device and the previous location change rate value of the mobile device is less than the preset threshold, the mobile device detects the RSS of the environment signal in the current environment again.

With reference to any one of the first aspect and the foregoing possible implementations, in another possible implementation, after the mobile device adjusts the positioning cycle of the mobile device based on the location change rate value, the recorded environment record information is cleared. In this way, a real-time effect of the recorded environment record information is improved, and positioning cycle adjustment accuracy is ensured.

With reference to any one of the first aspect and the foregoing possible implementations, in another possible implementation, after the mobile device obtains the group of environment record information in the current environment, if a quantity of groups of environment record information obtained by the mobile device is less than N, the mobile device obtains a group of environment record information in the current environment again.

According to a second aspect, an embodiment of the present invention provides a positioning cycle adjustment apparatus. The positioning cycle adjustment apparatus can implement functions in the foregoing method example. The functions may be implemented by using hardware, or may be implemented by using hardware executing corresponding software. The hardware or the software includes one or more modules corresponding to the foregoing functions.

With reference to the second aspect, in a possible implementation, a structure of the positioning cycle adjustment apparatus includes a processor and a transceiver. The processor is configured to support the positioning cycle adjustment apparatus in performing a corresponding function in the foregoing method. The transceiver is configured to support the positioning cycle adjustment apparatus in receiving an environment signal and communicating with another device. The positioning cycle adjustment apparatus may further include a memory. The memory is coupled to the processor and stores program instructions and data that are necessary for the positioning cycle adjustment apparatus.

According to a third aspect, an embodiment of the present invention provides a computer storage medium, configured to store a computer software instruction used by the foregoing positioning cycle adjustment apparatus. The computer software instruction includes a designed program used to perform the foregoing aspects.

The solutions provided in the second aspect and the third aspect are used to implement the positioning cycle adjustment method provided in the first aspect, and therefore can achieve a same beneficial effect as the first aspect. Details are not described herein.

DETAILED DESCRIPTION OF ILLUSTRATIVE EMBODIMENTS

Figure 1:
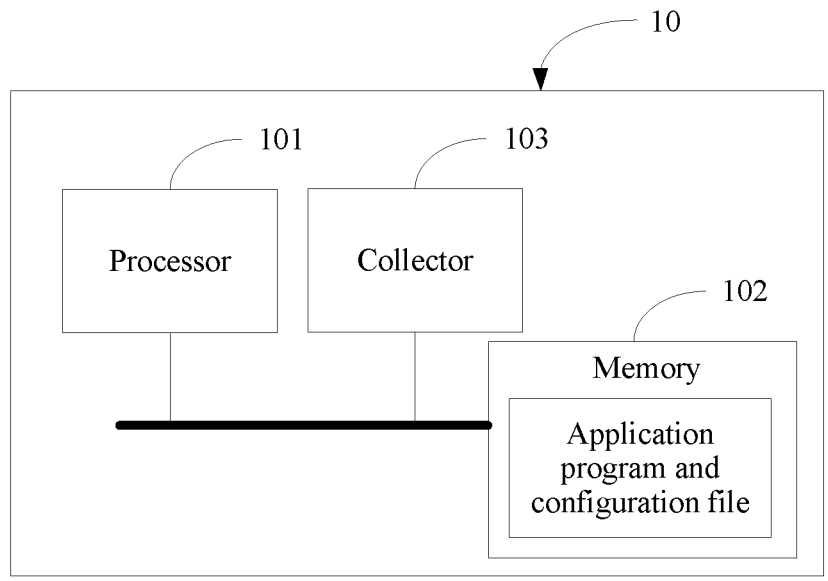
FIG. 1 is a schematic structural diagram of a positioning cycle adjustment apparatus according to an embodiment of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Currently, an LBS application of a mobile device becomes more popular. The LBS application of the mobile device periodically positions the mobile device to obtain a current geographic location of the mobile device, and provides a geographic location related service for a user of the mobile device. For example, a geographic alarm clock application provides, for the user based on a current positioned geographic location of the mobile device, an alarm clock service that matches the geographic location. A child/senior care application provides a specific location of a cared person for a child/senior caregiver based on the current positioned geographic location of the mobile device. A navigation application provides a preferred route to a destination for the user based on the current positioned geographic location of the mobile device. During implementation of many LBS applications, a length of a positioning cycle varies based on an application requirement. Some applications perform real-time positioning and are always in service, while some applications perform positioning at intervals.

A positioning technology may include but is not limited to GPS positioning, WiFi positioning, cellular positioning, inertial navigation positioning, and the like.

It should be noted that the mobile device may be user equipment (English full name: User Equipment, UE), a mobile phone, a tablet computer, a notebook computer, an ultra-mobile personal computer (English full name: Ultra-mobile Personal Computer, UMPC), a netbook, a personal digital assistant (English full name: Personal Digital Assistant, PDA), an electronic book, a mobile television, a wearable device, a personal computer (English full name: Personal Computer, PC), or the like. A type of the mobile device is not specifically limited either in the embodiments of the present invention.

Because positioning power consumption is relatively high, the positioning cycle may be adjusted based on an actual requirement to reduce the power consumption of the mobile device. However, as described in the background, when the positioning cycle is adjusted based on a destination, a movement direction, and a movement speed of the mobile device, a positioning process or a motion sensor is used. Consequently, affected by precision of the positioning technology or the motion sensor, a positioning cycle adjustment process is not accurate enough, and extra power consumption is caused.

Based on this, a basic principle of the embodiments of the present invention is as follows: The mobile device estimates a location change rate of the mobile device based on a detected environment signal, and then adjusts the positioning cycle of the mobile device based on the estimated location change rate of the mobile device. Because the mobile device adjusts the positioning cycle by detecting the existing environment signal, no positioning is required and no extra power consumption is caused. Positioning cycle adjustment is not affected by precision of another aspect, and no extra power consumption or only a little power consumption is caused. In addition, there is no need to know the destination of the mobile device. Therefore, the present invention can be applied to various scenarios.

FIG. 1 is a schematic structural diagram of a positioning cycle adjustment apparatus 10 related to the embodiments of the present invention. The positioning cycle adjustment apparatus 10 may be a part or all of a mobile device.

As shown in FIG. 1, the positioning cycle adjustment apparatus 10 may include a processor 101, a memory 102, and a collector 103.

Each component of the positioning cycle adjustment apparatus 10 is described in detail below with reference to FIG. 1.

The memory 102 may be a volatile memory (English full name: volatile memory), for example, a random access memory (English full name: random-access memory, RAM), or may be a non-volatile memory (English full name: non-volatile memory), for example, a read-only memory (English full name: read-only memory, ROM), a flash memory (English full name: flash memory), a hard disk (English full name: hard disk drive, HDD), or a solid-state drive (English full name: solid-state drive, SSD), or may be a combination of the foregoing types of memories, and is configured to store a relevant application program and a configuration file for implementing the method of the present invention.

The processor 101 is a control center of the positioning cycle adjustment apparatus 10, and may be a central processing unit (English full name: central processing unit, CPU), or may be an application-specific integrated circuit (English full name: Application Specific Integrated Circuit, ASIC), or may be one or more integrated circuits configured to implement the embodiments of the present invention, such as one or more microprocessors (English full name: digital signal processor, DSP) or one or more field programmable gate arrays (English full name: Field Programmable Gate Array, FPGA). The processor 101 may run or execute a software program and/or a module stored in the memory 102 and invoke data stored in the memory 102, to perform various functions of the positioning cycle adjustment apparatus 10.

The collector 103 is configured to detect a received signal strength of an environment signal. A type of the collector 103 may vary based on different types of environment signals.

For example, if the environment signal is a cellular signal or a WiFi signal, the collector 103 may be an antenna of the mobile device. If the environment signal is an optical signal, the collector 103 may be an optical receiver of the mobile device. If the environment signal is a geomagnetic field signal, the collector 103 may be a geomagnetic manometer.

Certainly, the foregoing example is merely an example for describing the type of the collector 103, and is not a specific limitation to the type of the collector 103. In actual application, any component that is used to detect the RSS of the environment signal can be referred to as the collector 103.

The embodiments of the present invention are described in detail below with reference to the accompanying drawings.

Nouns used in the embodiments of the present invention are first explained as follows:

A location change rate value of a mobile device is a location change speed of the mobile device per unit of time. The location change rate value of the mobile device is used to measure the location change speed of the mobile device by using a concept similar to a rate.

Environment record information is a group of information that includes an RSS value of an environment signal, a receiving time of the environment signal, and an information source identifier of the environment signal.

An information source of the environment signal is a device that generates the environment signal. For example, if the environment signal is a cellular signal, the information source of the environment signal may be a base station.

The embodiments of the present invention provide a positioning cycle adjustment method, to adjust a positioning cycle in an LBS application of the mobile device. The positioning cycle adjustment method provided in the embodiments of the present invention is described below from a perspective of a working process of the mobile device.

It should be noted that the mobile device is a positioning cycle adjustment apparatus or the mobile device includes the positioning cycle adjustment apparatus. Therefore, in the embodiments of the present invention, an action performed by the mobile device is an action performed by the positioning cycle adjustment apparatus.

Figure 2:
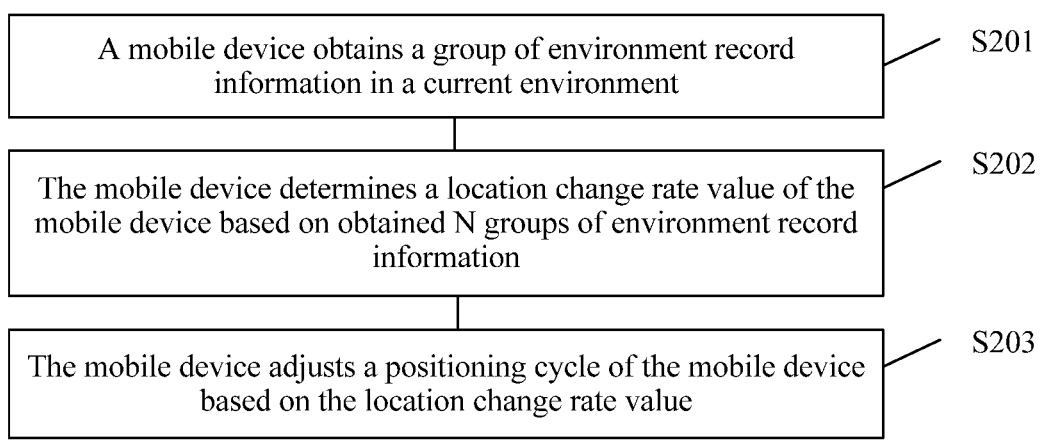
FIG. 2 is a schematic flowchart of a positioning cycle adjustment method according to an embodiment of the present invention.

As shown in FIG. 2, a positioning cycle adjustment method provided in this application may include the following steps.

S201. A mobile device obtains a group of environment record information in a current environment.

The environment record information includes an RSS of an environment signal, a receiving time of the environment signal, and an information source identifier of the environment signal in the current environment.

The information source identifier is information that uniquely identifies an information source. A type and content of the information source identifier are not specifically limited in this embodiment of the present invention. The receiving time of the environment signal may include an absolute time or a relative time. This is not specifically limited in this embodiment of this application.

The environment signal may include but is not limited to at least one of the following signals that can be detected by the mobile device: a cellular signal, a WiFi signal, a Bluetooth signal, an optical signal, and a geomagnetic field signal. The optical signal may be a light emitting diode (English full name: Light Emitting Diode, LED) visible light communications (English full name: Visible Light Communications, VLC) signal.

It should be noted that the environment signal may further include a signal other than the foregoing five signals. A type of the environment signal is not specifically limited in this embodiment of the present invention. Any signal, in an environment, that can be used to estimate a location change speed of the mobile device can be used as the environment signal.

Specifically, when the type of the environment signal varies, a manner of detecting the RSS of the environment signal in S201 also varies.

For example, when the environment signal is the cellular signal, the information source is a cellular base station. The mobile device first accesses a serving cell and scans all surrounding detectable signals of the base station. The mobile terminal receives broadcast information of the serving cell, and obtains an identifier of the serving cell and an RSS of the cellular signal from the broadcast information. The mobile device monitors a broadcast signal of the serving cell to extract a frequency of a neighboring cell from a system information block (English full name: System Information Block, SIB) in the broadcast information. Then the mobile device performs scanning and measurement at the frequency of the neighboring cell to obtain an identifier of each neighboring cell and an RSS of a cellular signal that is of each neighboring cell and that is received by the mobile device.

Specifically, measuring the neighboring cell to obtain the identifier of each neighboring cell and the RSS of the cellular signal may specifically include: measuring a received signal strength indicator (English full name: Received Signal Strength Indicator, RSSI) or reference signal received power (English full name: Reference Signal Received Power, RSRP) of the neighboring cell, receiving a broadcast message of the neighboring cell, and obtaining information such as a base station identifier (English full name: identifier, ID) and the RSS of the neighboring cell from the broadcast information.

For example, when the environment signal is the WiFi signal, the information source is a WiFi access point (English full name: Access Point, AP). The mobile device receives the WiFi signal and an identifier of the WiFi AP in the environment through scanning.

For example, when the environment signal is the Bluetooth signal, the information source is a Bluetooth beacon (Beacon). The mobile device receives the Bluetooth signal and an identifier of the Bluetooth beacon in the environment through scanning.

For example, when the environment signal is the optical signal, the information source is a VLC LED lamp. The mobile device receives the optical signal and an identifier of the VLC LED lamp in the environment through scanning.

For example, when the environment signal is the geomagnetic field signal, the information source is the earth. The mobile device scans the geomagnetic field signal in the environment by using a magnetic manometer.

It should be noted that the foregoing example is merely an example for describing a process of performing S201 for different environment signals, and is not a limitation to the process of S201. When the environment signal is a signal of another type, a corresponding detection manner is corresponding to the environment signal, so as to obtain the RSS of the environment signal.

Optionally, the group of environment record information includes an RSS of at least one environment signal detected by the mobile device, a receiving time of each of the at least one environment signal, and an information source identifier of each of the at least one environment signal.

For example, it is assumed that the environment signal is a cellular signal and a Bluetooth signal that are generated by a base station. At a moment t1, the mobile device scans five cellular cells (including one serving cell and four neighboring cells) that are respectively denoted as A, B, C, D, and E, and RSSs of cellular signals from base stations of the cellular cells are respectively $R_A^1$, $R_B^1$, $R_C^1$, and $R_E^1$. At the moment t1, the mobile device further scans two Bluetooth beacons that are respectively denoted as F and G, and RSSs of Bluetooth signals from the Bluetooth beacons are respectively $R_F^1$ and $R_G^1$. A superscript represents a receiving time, and a subscript is an information source identifier. Recorded environment record information is X1={($R_A^1$, t1, A), ($R_B^1$, t1, B), ($R_C^1$, t1, C), ($R_D^1$, t1, D), ($R_E^1$, t1, E), ($R_F^1$, t1, F), ($R_G^1$, t1, G)}. At a moment t2, the mobile device also scans the five cellular cells (including one serving cell and four neighboring cells), and RSSs from the base stations of the cellular cells are respectively $R_A^2$, $R_B^2$, $R_C^2$, and $R_E^2$. At the moment t2, the mobile device further scans the two Bluetooth beacons, and RSSs of Bluetooth signals from the Bluetooth beacons are respectively $R_F^2$ and $R_G^2$. Stored environment record information is X2={($R_A^2$, t2, A), ($R_B^2$, t2, B), ($R_C^2$, t2, C), ($R_D^2$, t2, D), ($R_E^2$, t2, E), ($R_F^2$, t2, F), ($R_G^2$, t2, G)}.

It should be noted that the foregoing example is merely an example for describing the environment record information, and is not a specific limitation to content and a form of the environment record information.

It should be noted that when the mobile device moves, each time S201 is performed, types and a quantity of obtained information sources of environment signals are not necessarily fixed. An information source X may be obtained at a moment, but the information source X may not be obtained at a next moment.

Figure 2A:
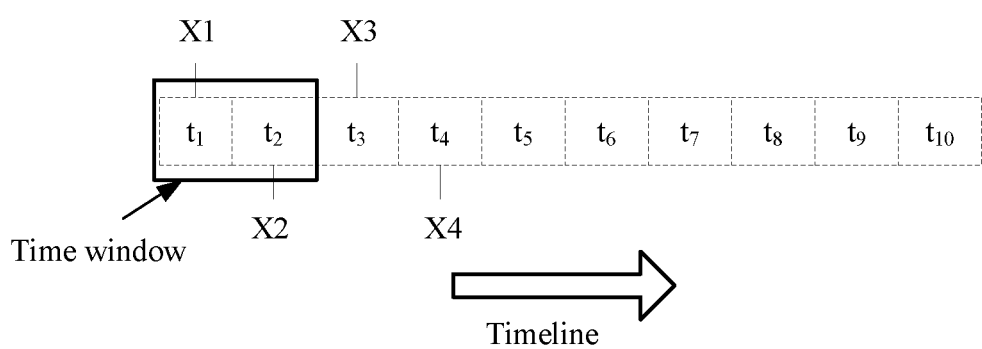
FIG. 2a is a schematic diagram of obtaining environment record information by a mobile device according to an embodiment of the present invention.

Optionally, the mobile device may periodically perform S201, and one cycle is one time block in a timeline shown in FIG. 2a. As shown in FIG. 2a, FIG. 2a is a schematic diagram of obtaining the environment record information by the mobile device in S201. In FIG. 2a, t1 to t10 indicate different moments for performing S201. One group of environment record information is obtained at each moment. At the moment t1, S201 is performed to obtain the environment record information X1, at the moment t2, S201 is performed to obtain the environment record information X2, at the moment t3, S201 is performed to obtain environment record information X3, at the moment t4, S201 is performed to obtain environment record information X4, and so on.

S202. The mobile device determines a location change rate value of the mobile device based on obtained N groups of environment record information.

The location change rate value is used to reflect a location change distance of the mobile device per unit of time, and indicates a location change speed of the mobile device. N is greater than or equal to 2. It should be noted that a value of N may be set based on an actual requirement. The value of N is not limited in this embodiment of the present invention.

Optionally, a fixed value of N may be set, or the value of N may be adaptively and dynamically configured based on an actual requirement in a process of executing a solution of this embodiment of the present invention. This is not specifically limited in this embodiment of the present invention.

Further, when the value of N is adaptively and dynamically configured, the value of N may be set based on the location change rate value that is of the mobile device and that is determined in S202.

For example, a correspondence may be established. The correspondence includes at least one location change rate value and a value of N that is in a one-to-one correspondence with the at least one location change rate value. When the location change rate value of the mobile device is determined in S202, the value of N may be changed to a value corresponding to the determined location change rate value of the mobile device in the correspondence. Specific content of the correspondence may be set based on an actual requirement, and is not specifically limited in this embodiment of the present invention.

For example, a relational expression for calculating the value of N based on the location change rate value may be preset. When the location change rate value of the mobile device is determined in S202, the location change rate value of the mobile device is substituted into the preset relational expression, so that an adjusted value of N can be obtained. Content of the preset relational expression is not specifically limited in this embodiment of the present invention. The preset relational expression may be a linear relational expression, or may be a power function relational expression, or certainly may be another relational expression.

Certainly, the value of N may be adaptively and dynamically configured with reference to other information. This is not specifically limited in this application and is not described in detail herein.

Optionally, as shown in FIG. 2a, S202 may be performed based on environment record information in a specific time window. A quantity of time blocks included in the time window is the value of N. For example, FIG. 2a shows a time window size when N is 2.

It should be noted that FIG. 2a merely uses an example to indicate that N may be implemented by using the time window, and is not a limitation to the time window size.

S202 may be performed in a plurality of implementations. Two processes of performing S202 are described below in this embodiment of the present invention, but are not a specific limitation to the process of S202.

Specifically, a specific implementation in which the mobile device determines the location change rate value of the mobile device based on the obtained N groups of environment record information in S202 may include but is not limited to the following two implementations:

Implementation 1

In Implementation 1, the mobile device obtains the location change rate value of the mobile device based on the stored N groups of environment record information by performing the following step 1 and step 2.

Step 1: Calculate, by using a quantity of information sources that generate the environment signal as a dimension of the environment record information and using the environment record information as a location point of the mobile device, a distance between location points of the mobile device that are corresponding to the N groups of environment record information.

Optionally, when the mobile device determines the location change rate value of the mobile device based on the N groups of environment record information obtained in S201, the distance, calculated in step 1, between the location points of the mobile device that are corresponding to the N groups of environment record information may include any one of the following distances: a Euclidean distance, a standardized Euclidean distance, a Manhattan distance, and a Chebyshev distance. Certainly, the distance between the N groups of environment record information that is calculated in step 1 may be a distance obtained in another distance calculation manner. This is not specifically limited in this embodiment of the present invention.

Specifically, a Euclidean distance between location points of the mobile device that are corresponding to first environment record information and second environment record information is calculated as:

$$d_{12} = \sqrt{\sum_{k=1}^{M} (RSS_{1k} - RSS_{2k})^2}.$$

$RSS_{1k}$ is an RSS of an environment signal generated by a $k^{th}$ information source in the first environment record information, and $RSS_{2k}$ is an RSS of an environment signal generated by a $k^{th}$ information source in the second environment record information.

For example, based on the example in S201, a Euclidean distance between location points of the mobile device that are corresponding to the environment record information stored at the moment t1 and the moment t2 is calculated as follows:

$$\sqrt{\begin{array}{c}(R_A^2 - R_A^1)^2 + (R_B^2 - R_B^1)^2 + (R_C^2 - R_C^1)^2 + (R_D^2 - R_D^1)^2 + \\ (R_E^2 - R_E^1)^2 + (R_F^2 - R_F^1)^2 + (R_G^2 - R_G^1)^2\end{array}}.$$

Specifically, a standardized Euclidean distance between the location points of the mobile device that are corresponding to the first environment record information and the second environment record information is calculated as:

$$d_{12} = \sqrt{\sum_{k=1}^{M} \left(\frac{RSS_{1k} - RSS_{2k}}{S_k}\right)^2}.$$

$S_k$ is a component standard deviation.

Specifically, the Manhattan distance is also referred to as a city block distance. A Manhattan distance between the location points of the mobile device that are corresponding to the first environment record information and the second environment record information is calculated as:

$$d_{12} = \sum_{k=1}^{M} |RSS_{1k} - RSS_{2k}|.$$

Specifically, a Chebyshev distance between the location points of the mobile device that are corresponding to the first environment record information and the second environment record information is calculated as:

$$d_{12} = \lim_{i \to \infty} \left(\sum_{k=1}^{M} |RSS_{1k} - RSS_{2k}|^i\right)^{1/i}.$$

Further, when the distance between the location points of the mobile device that are corresponding to the N groups of environment record information is calculated in step 1, a solution for performing step 1 is affected when the value of N varies. Specifically, the solution may include but is not limited to the following three solutions:

Solution 1

If N is equal to 2, calculate a distance between location points of the mobile device that are corresponding to two groups of environment record information.

Solution 2

If N is greater than 2, calculate the distance between the N groups of environment record information, including: calculating a distance between location points of the mobile device that are corresponding to environment record information of an environment signal with an earliest receiving time and environment record information of an environment signal with a latest receiving time in the N groups of environment record information, and using the distance as the distance between the location points of the mobile device that are corresponding to the N groups of environment record information.

Solution 3

If N is greater than 2, separately calculate a distance between location points of the mobile device that are corresponding to two groups of environment record information of two environment signals with adjacent receiving time in the N groups of environment record information, and average obtained N−1 distances to obtain the distance between the location points of the mobile device that are corresponding to the N groups of environment record information.

It should be noted that for different values of N, only three solutions are used as an example above for describing the solution for performing step 1, but are not a limitation to a process of performing step 1.

Further, quantities of environment signals detected by the mobile device at different moments are not necessarily the same, and quantities of information sources that generate the environment signals are not necessarily the same. When the distance between the two groups of environment record information is calculated, dimensions included in the two groups of environment record information may be different. The dimensions of the two groups of environment record information may be made the same through filling with a predetermined value. Specific implementation is as follows:

Before the distance between the location points of the mobile device that are corresponding to the N groups of environment record information is calculated, if the first environment record information includes an RSS of an environment signal generated by a first information source, and the second environment record information does not include the RSS of the environment signal generated by the first information source, a predetermined value is assigned, in the second environment record information, to the RSS of the environment signal generated by the first information source, and then the distance between the location points of the mobile device that are corresponding to the first environment record information and the second environment record information is calculated. The first environment record information and the second environment record information are two groups of environment record information that are used to calculate the distance in the N groups of environment record information.

It should be noted that a specific value of the predetermined value may be set based on an actual requirement. This is not specifically limited in this application.

For example, it is assumed that the environment signal is a cellular signal generated by a base station. At the moment t1, the mobile device scans four cellular cells that are respectively denoted as A, B, C, and D, and RSSs of cellular signals from base stations of the cellular cells are respectively $R_A^1$, $R_B^1$, $R_C^1$, and $R_D^1$. At the moment t1, the mobile device further scans two Bluetooth beacons that are respectively denoted as E and F, and RSSs of Bluetooth signals from the Bluetooth beacons are respectively $R_E^1$ and $R_F^1$. Stored environment record information is X1={($R_A^1$, t1, A), ($R_B^1$, t1, B), ($R_C^1$, t1, C), ($R_D^1$, t1, D), ($R_E^1$, t1, E), ($R_F^1$, t1, F)}. At the moment t2, the mobile device scans cellular cells A, B, C, and D, and scans Bluetooth beacons E and H. RSSs from base stations of the cellular cells are respectively $R_A^2$, $R_B^2$, $R_C^2$, and $R_D^2$, and RSSs of Bluetooth signals from the Bluetooth beacons are respectively $R_E^2$ and $R_H^2$. Stored environment record information is X2={($R_A^2$, t2, A), ($R_B^2$, t2, B), ($R_C^2$, t2, C), ($R_D^2$, t2, D), ($R_E^2$, t2, E), ($R_H^2$, t2, H)}.

It should be noted that when the mobile device obtains the RSS of the environment signal through scanning, if the obtained RSS value is less than or equal to an identifiable threshold, the RSS value that is less than or equal to the identifiable threshold is ignored. In other words, no information source of the environment signal is scanned. A specific value of the identifiable threshold may be determined based on an actual requirement. This is not limited in this embodiment of this application.

For example, the identifiable threshold may be −100 dB or −200 dB.

If a distance between location points of the mobile device that are corresponding to X1 and X2 is calculated, compared with X2, X1 lacks an RSS of the cellular cell H and needs to be filled, and compared with X1, X2 lacks an RSS of the cellular cell F and needs to be filled. It is assumed that the predetermined value is δ. For example, a Euclidean distance between the location points of the mobile device that are corresponding to X1 and X2 may be calculated as follows:

$$\sqrt{\begin{array}{c}(R_A^2 - R_A^1)^2 + (R_B^2 - R_B^1)^2 + (R_C^2 - R_C^1)^2 + (R_D^2 - R_D^1)^2 + \\ (R_E^2 - R_E^1)^2 + (\delta - R_F^1)^2 + (R_H^2 - \delta)^2\end{array}}.$$

Step 2: Divide the distance calculated in step 1 by a receiving time difference between an environment signal with an earliest receiving time and an environment signal with a latest receiving time in the N groups of environment signals, to obtain the location change rate value of the mobile device.

Implementation2

Extract characteristic values of the N groups of environment record information; and input the characteristic values of the N groups of environment record information into a training model, to obtain a location change rate value that is output by the training model, and use the location change rate value as the location change rate value of the mobile device.

The characteristic value is a value that can be identified by the training model. The characteristic value of the environment record information may include but is not limited to a Euclidean distance, a mean value of the Euclidean distance, a variance of the Euclidean distance, or another value. A type of the characteristic value of the environment record information is not specifically limited in this application. The training model is used to obtain, based on an input characteristic value of environment record information, a location change rate value corresponding to the input environment record information.

Specifically, the training model is obtained through training by using a machine learning algorithm after the mobile device collects training data and then extracts a feature of the training data. A training process is not specifically limited in this embodiment of the present invention. Any manner of obtaining the location change rate value of the mobile device by using the training model shall fall within the protection scope of this application.

The machine learning algorithm may include a support vector machine (English full name: Support Vector Machine, SVM), a neural network (English full name: Neural Network, NN), a random forest, and the like. A type of the machine learning algorithm is not specifically limited in this embodiment of the present invention.

S203. The mobile device adjusts a positioning cycle of the mobile device based on the location change rate value.

Specifically, the mobile device may adjust the positioning cycle of the mobile device based on the location change rate value in S203 by using the following Solution A or Solution B.

Solution A: Adjust the positioning cycle of the mobile device to a positioning cycle, in a preset correspondence, corresponding to the location change rate value that is of the mobile device and that is determined in S202.

The preset correspondence includes at least one location change rate value and a positioning cycle that is in a one-to-one correspondence with the at least one location change rate value. Alternatively, the preset correspondence includes at least one preset location change rate value range and a positioning cycle corresponding to each preset location change rate value range.

It should be noted that in S203, to query the preset correspondence based on the location change rate value that is of the mobile device and that is determined in S202, the location change rate value determined in S202 may be directly used to query the preset correspondence so as to perform S203. Alternatively, in S203, to query the preset correspondence based on the location change rate value that is of the mobile device and that is determined in S202, the location change rate value determined in S202 may be preprocessed to query the preset correspondence so as to perform S203. This is not specifically limited in this embodiment of the present invention.

The preprocessing may include rounding off, formula calculation, or the like. The preprocessing is used to process the location change rate value determined in S202, so that a processed location change rate value can match a preset location change rate value in the preset correspondence. A specific preprocessing means is not limited either in this embodiment of the present invention.

For example, Table 1 and Table 2 show two different preset correspondences.

TABLE 1

| Location change rate value | Positioning cycle |
| --- | --- |
| X | a |
| Y | b |
| Z | c |
| . . . | . . . |

TABLE 2

| Location change rate value | Positioning cycle |
|---|---|
| . . . | . . . |
| Greater than or equal to X and less than Y | a |
| Greater than or equal to Y and less than Z | b |
| Greater than or equal to Z and less than Q | c |
| . . . | . . . |

It should be noted that Table 1 and Table 2 merely use examples to describe content and forms of the preset correspondence, and are not a limitation to the form and the content of the preset correspondence. In actual application, the content and the form of the preset correspondence may be set based on an actual requirement.

Solution B: Preset a function relationship between the location change rate value and the positioning cycle, and substitute the location change rate value that is of the mobile device and that is determined in S202 into the preset function relationship, to determine an adjusted positioning cycle of the mobile device through calculation.

It should be noted that content of the preset function relationship between the location change rate value and the positioning cycle is not specifically limited in this embodiment of the present invention. The preset function relationship may be a linear relational expression, or may be a power function relational expression, or certainly may be another function relationship.

It should be noted that according to the positioning cycle adjustment method provided in this embodiment of the present invention, a process of S201 to S203 is cyclically performed to adaptively and dynamically adjust the positioning cycle of the mobile device, so as to better reduce power consumption.

It should be further noted that when the process of S201 to S203 is cyclically performed, two rounds may be continuously performed or may be periodically performed. This is not specifically limited in this embodiment of the present invention. When the process of S201 to S203 is periodically and cyclically performed, a round cycle may be set based on an actual requirement. This is not specifically limited in this embodiment of the present invention.

Further, when an LBS application of the mobile device is enabled, the positioning cycle is an initialized positioning cycle. Duration of the initialized positioning cycle may be configured based on an actual requirement. This is not specifically limited in this embodiment of the present invention.

Further, for a solution of continuously and cyclically performing the process of S201 to S203, after S203 is performed, the mobile device may determine whether a positioning moment arrives. If the positioning moment arrives, S201 is performed after positioning is performed. If the positioning moment does not arrive, S201 is performed to execute a next round of solutions of the present invention.

Certainly, in a process of this embodiment of the present invention, a positioning operation is the same as a conventional implementation, and details are not described herein.

In this way, according to the positioning cycle adjustment method provided in this embodiment of the present invention, the mobile device adjusts the positioning cycle of the mobile device based on the location change rate value after the mobile device obtains the environment record information of the existing environment signal and further obtains the location change rate value. To adjust the positioning cycle, there is no need to know a destination of the mobile device, and an application scenario is not limited. The positioning cycle can be adjusted in various scenarios by using the solutions of this application. Further, according to the positioning cycle adjustment solution in this application, the RSS of the existing environment signal is used without extra power consumption of the mobile device, so that power consumption of the mobile device is lower. In the positioning cycle adjustment solution of this application, positioning cycle adjustment accuracy is improved because no positioning is required.

Figure 3:
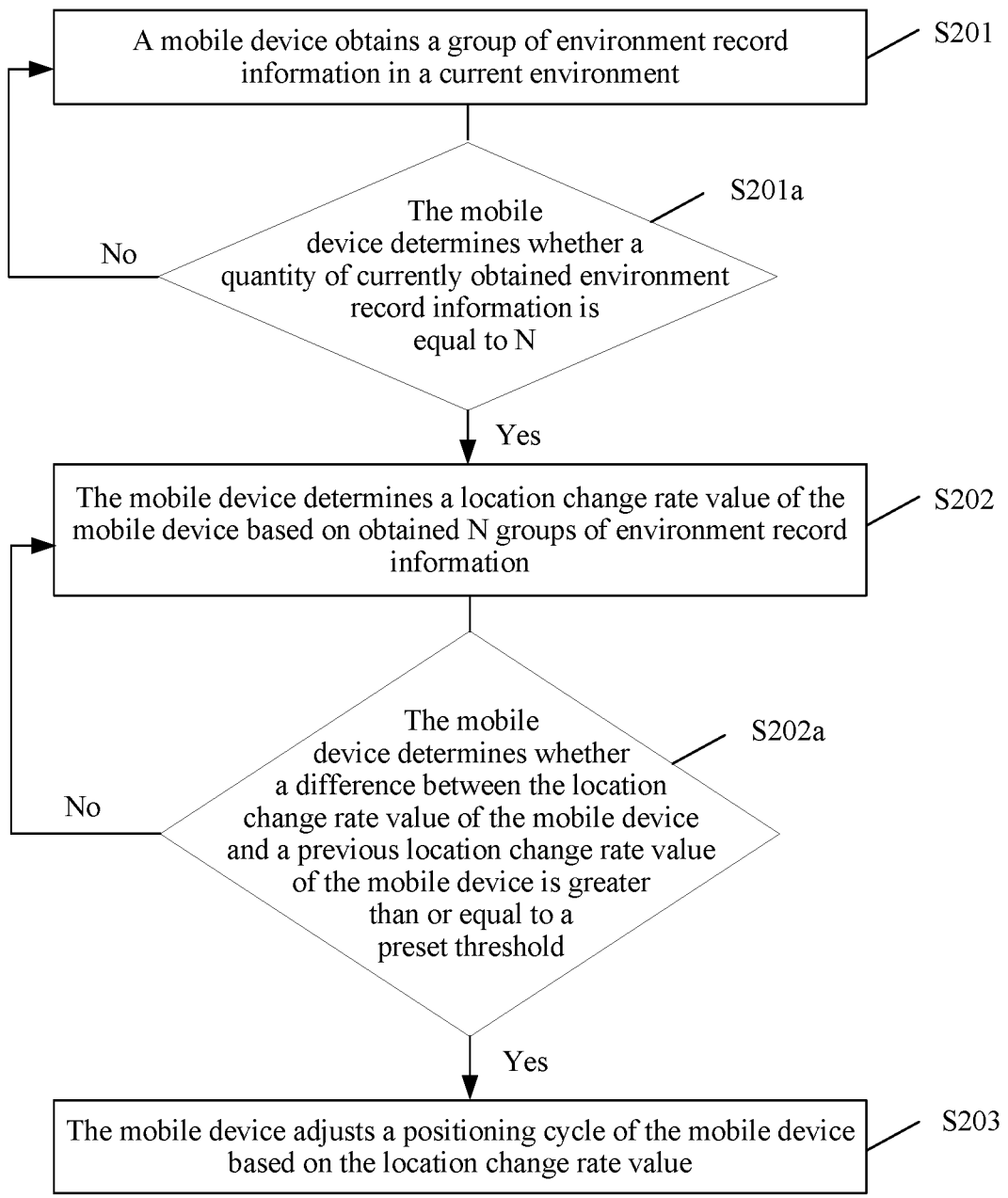
FIG. 3 is a schematic flowchart of another positioning cycle adjustment method according to an embodiment of the present invention.

Further, to improve processing efficiency of the mobile device and avoid frequent invalid positioning cycle adjustment, as shown in FIG. 3, after S202, the method may include the following step:

S202a. The mobile device determines whether a difference between the location change rate value of the mobile device and a previous location change rate value of the mobile device is greater than or equal to a preset threshold.

Specifically, if it is determined in S202a that the difference between the location change rate value that is of the mobile device and that is determined in S202 and the previous location change rate value of the mobile device is greater than or equal to the preset threshold, S203 is performed.

Optionally, if it is determined in S202a that the difference between the location change rate value that is of the mobile device and that is determined in S202 and the previous location change rate value of the mobile device is less than the preset threshold, S201, S202, and S202a are performed again.

It should be noted that a value of the preset threshold may be set based on an actual requirement. This is not specifically limited in this embodiment of the present invention.

Further, to improve processing efficiency of the mobile device and avoid frequent invalid positioning cycle adjustment, as shown in FIG. 3, after S201, the method may include the following step:

S201a. The mobile device determines whether a quantity of currently obtained environment record information is equal to N.

Specifically, if it is determined in S201a that the quantity of currently obtained environment record information is equal to N, S202 is performed.

Optionally, if it is determined in S201a that the quantity of currently obtained environment record information is not equal to N, S201 and S201a are performed again. After S201a is performed, it is determined whether to perform S202 or to perform S201 again.

The foregoing mainly describes the solutions provided in the embodiments of the present invention from a perspective of a working process of the mobile device. The mobile device may be a positioning cycle adjustment apparatus or the mobile device includes the positioning cycle adjustment apparatus. It may be understood that to implement the foregoing functions, the positioning cycle adjustment apparatus includes corresponding hardware structures and/or software modules for performing various functions. A person skilled in the art should be easily aware that, with reference to units and algorithm steps in the examples described in the embodiments disclosed in this specification, the present invention can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

The positioning cycle adjustment apparatus may be divided into function modules based on the method examples in the embodiments of the present invention. For example, function modules corresponding to various functions may be obtained through division, or two or more functions may be integrated into one processing module. The integrated module may be implemented in a form of hardware, or may be implemented in a form of a software function module. It should be noted that, the module division in the embodiments of the present invention is an example, and is merely logical function division. There may be another division manner in actual implementation.

Figure 4:
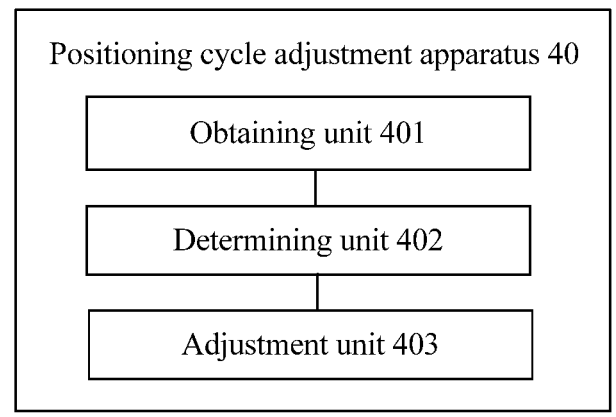
FIG. 4 is a schematic structural diagram of another positioning cycle adjustment apparatus according to an embodiment of the present invention.

When function modules corresponding to various functions are obtained through division, FIG. 4 is a possible schematic structural diagram of a positioning cycle adjustment apparatus 40 in the foregoing embodiment. The positioning cycle adjustment apparatus 40 includes an obtaining unit 401, a determining unit 402, and an adjustment unit 403. The obtaining unit 401 is configured to support the positioning cycle adjustment apparatus 40 in performing the process S201 in FIG. 2 or FIG. 3. The determining unit 402 is configured to support the positioning cycle adjustment apparatus 40 in performing the process S202 in FIG. 2 or FIG. 3. The adjustment unit 403 is configured to support the positioning cycle adjustment apparatus 40 in performing the process S203 in FIG. 2 or FIG. 3. All related content of each step in the foregoing method embodiment may be cited in function descriptions of a corresponding function module, and details are not described herein.

Figure 5:
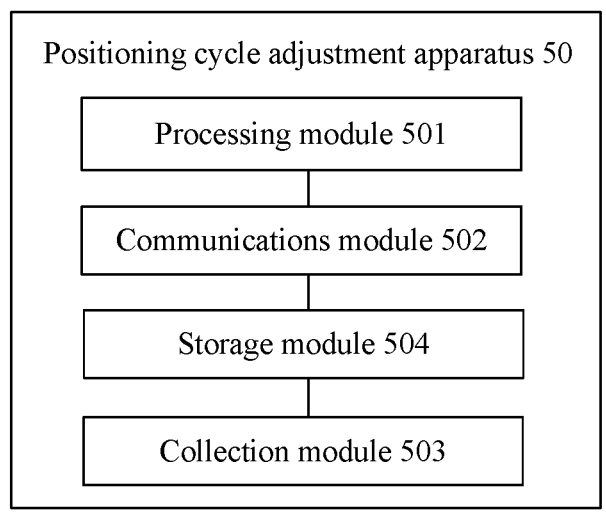
FIG. 5 is a schematic structural diagram of still another positioning cycle adjustment apparatus according to an embodiment of the present invention.

When an integrated unit is used, FIG. 5 is a possible schematic structural diagram of a positioning cycle adjustment apparatus 50 in the foregoing embodiment. The positioning cycle adjustment apparatus 50 may include a processing module 501, a communications module 502, and a collection module 503. The processing module 501 is configured to control and manage an action of the positioning cycle adjustment apparatus 50. For example, the processing module 501 is configured to support, by using the collection module 503, the positioning cycle adjustment apparatus 50 in performing the process S201 in FIG. 2 or FIG. 3. The processing module 501 is further configured to support the positioning cycle adjustment apparatus 50 in performing the processes S201a, S202, S202a, and S203 in FIG. 2 or FIG. 3, and/or is configured to perform another process of the technology described in this specification. The communications module 502 is configured to support communication between the positioning cycle adjustment apparatus 50 and another network entity. The positioning cycle adjustment apparatus 50 may further include a storage module 504, configured to store program code and data of the positioning cycle adjustment apparatus 50.

The processing module 501 may be the processor 101 in the physical structure of the positioning cycle adjustment apparatus 10 shown in FIG. 1, and the processor 101 may be a processor or a controller, for example, may be a CPU, a general-purpose processor, a DSP, an ASIC, an FPGA or another programmable logic device, a transistor logic device, a hardware component, or any combination thereof. The processor 101 may implement or execute various example logical blocks, modules, and circuits described with reference to content disclosed in the present invention. The processor 101 may be a combination of processors implementing a computing function, for example, one microprocessor or a combination of a plurality of microprocessors, or a combination of a DSP and a microprocessor. The communications module 502 may be a communications port, or may be a transceiver, a transceiver circuit, a communications interface, or the like. The collection module 503 may be the collector 103 in the physical structure of the positioning cycle adjustment apparatus 10 shown in FIG. 1, and the collector 103 may be a sensor or a functional unit. The storage module 504 may be the memory 102 in the physical structure of the positioning cycle adjustment apparatus 10 shown in FIG. 1.

When the processing module 101 is a processor, the collection module 503 is a collector, and the storage module 504 is a memory, the positioning cycle adjustment apparatus 50 in FIG. 5 in the embodiments of the present invention may be the positioning cycle adjustment apparatus 10 shown in FIG. 1.

As described above, the positioning cycle adjustment apparatus 10, 40, or 50 may be a part or all of a mobile device. The mobile device provided in this embodiment of the present invention may be configured to implement the method implemented in the foregoing embodiments of the present invention. For ease of description, only parts related to this embodiment of the present invention are shown. For undisclosed specific technical details, refer to the embodiments of the present invention.

Figure 6:
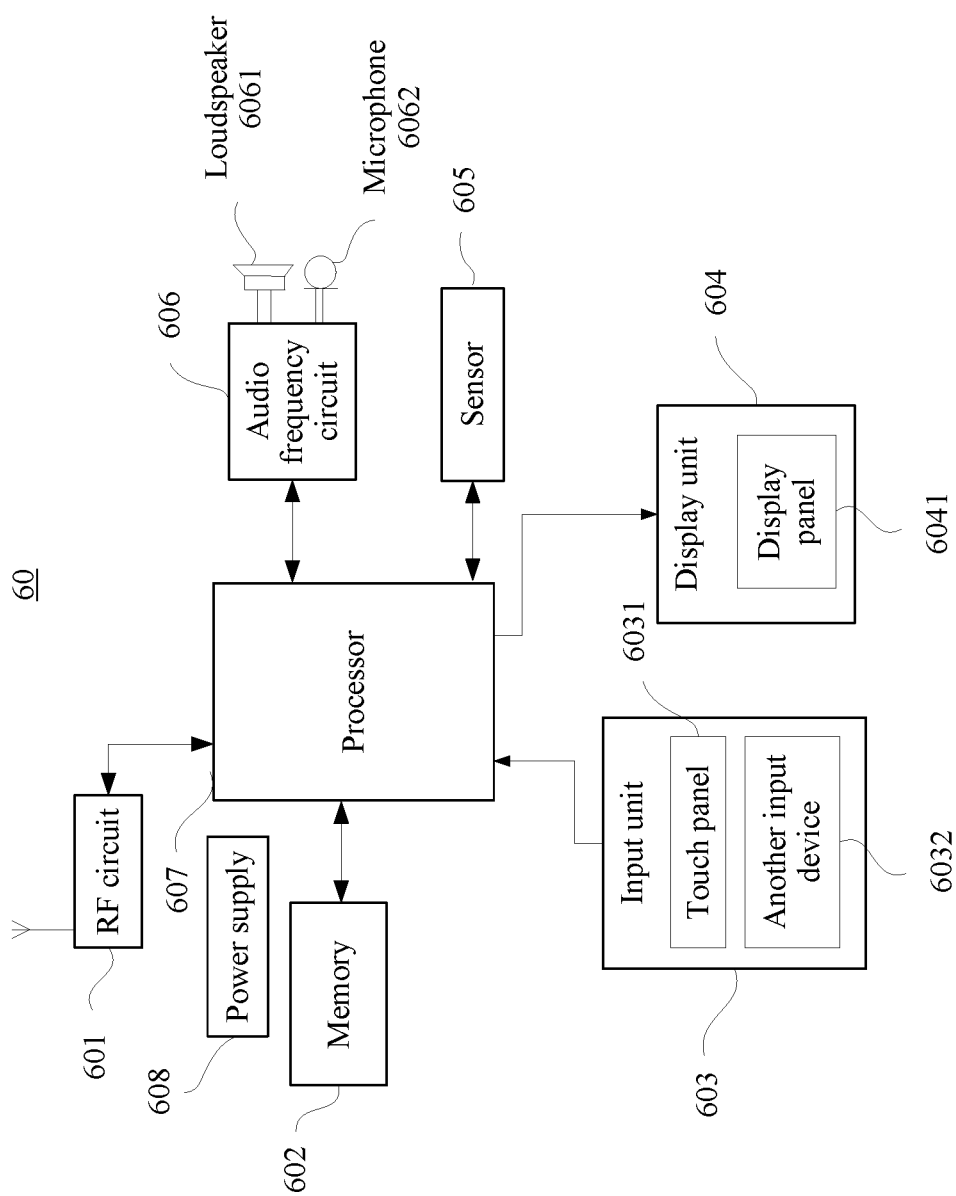
FIG. 6 is a schematic structural diagram of a mobile phone according to an embodiment of the present invention.

In an embodiment of the present invention, an example in which a mobile device is a mobile phone 60 is used for description. FIG. 6 is a block diagram of a partial structure of the mobile phone 60 related to the embodiments of the present invention.

As shown in FIG. 6, the mobile phone 60 includes components such as a radio frequency (English full name: radio frequency, RF) circuit 601, a memory 602, an input unit 603, a display unit 604, a sensor 605, an audio frequency circuit 606, a processor 607, and a power supply 608. A person skilled in the art may understand that, the structure of the mobile phone shown in FIG. 6 does not constitute a limitation on the mobile phone, and the mobile phone may include more or fewer components than those shown in the figure, or include a combination of some components, or include components differently disposed.

The following describes all components of the mobile phone 60 in detail with reference to FIG. 6.

The RF circuit 601 may be configured to receive and send information, or receive and send a signal during a call, and is further configured to support the mobile phone 60 in performing S201 shown in FIG. 2 or FIG. 3, to detect an RSS when an environment signal is a cellular signal. In particular, after receiving downlink information from a base station, the RF circuit 601 sends the downlink information to the processor 607 for processing. In addition, the RF circuit 601 sends uplink data to the base station. Generally, the RF circuit 601 includes but is not limited to an antenna, at least one amplifier, a transceiver, a coupler, a low noise amplifier (English full name: low noise amplifier, LNA), a duplexer, and the like.

Although not shown, a WiFi module, a Bluetooth module, an optical module, or the like may be further included in the mobile phone 60, and is configured to support the mobile phone 60 in performing S201 shown in FIG. 2 or FIG. 3, to detect an RSS when the environment signal is a WiFi signal, a Bluetooth signal, or an optical signal.

In addition, the RF circuit 601 may communicate with a network and another device through wireless communication. The wireless communication may use any communication standard or protocol, including but not limited to a Global System for Mobile Communications (English full name: global system of mobile communication, GSM), a general packet radio service (English full name: general packet radio service, GPRS), Code Division Multiple Access (English full name: code division multiple access, CDMA), Wideband Code Division Multiple Access (English full name: wideband code division multiple access, WCDMA), Long Term Evolution (English full name: long term evolution, LTE), email, a short message service (English full name: short messaging service, SMS), or the like.

The memory 602 may be configured to store a software program and a module. The processor 607 executes various functional applications and data processing of the mobile phone 60 by running the software program and the module stored in the memory 602.

The memory 602 may mainly include a program storage area and a data storage area. The program storage area may store an operating system, an application program required by at least one function (such as an audio play function or an image play function), and the like. The data storage area may store data (such as audio data, image data, or an address book) created based on use of the mobile phone 60, and the like.

In addition, the memory 602 may include a high-speed random access memory, or may include a non-volatile memory, such as at least one magnetic disk storage device, a flash memory device, or another volatile solid-state storage device.

The input unit 603 may be configured to: receive entered digits or character information, and generate key signal input related to user setting and function control of the mobile phone 60.

Specifically, the input unit 603 may include a touchscreen 6031 and another input device 6032. The touchscreen 6031 is also referred to as a touch panel and may collect a touch operation (for example, an operation performed by a user on the touchscreen 6031 or near the touchscreen 6031 by using any proper object or accessory, such as a finger or a stylus) performed by the user on or near the touchscreen, and drive a corresponding connection apparatus based on a preset program.

Optionally, the touchscreen 6031 may include two pails: a touch detection apparatus and a touch controller.

The touch detection apparatus detects a touch orientation of the user, detects a signal brought by the touch operation, and transmits the signal to the touch controller. The touch controller receives touch information from the touch detection apparatus, converts the touch information into touch point coordinates, and sends the touch point coordinates to the processor 607, and can receive and execute a command sent by the processor 607.

In addition, the touchscreen 6031 may be implemented by using a plurality of types, such as a resistive type, a capacitive type, an infrared ray, and a surface acoustic wave. In addition to the touchscreen 6031, the input unit 603 may include the another input device 6032. Specifically, the another input device 6032 may include but is not limited to one or more of a physical keyboard, a function key (such as a volume control key or an on/off key), a trackball, a mouse, a joystick, and the like.

The display unit 604 may be configured to display information entered by the user or information provided for the user, and various menus of the mobile phone 60.

The display unit 604 may include a display panel 6041. Optionally, the display panel 6041 may be configured in a form of a liquid crystal display (English full name: Liquid Crystal Display, LCD), an organic light-emitting diode (English full name: Organic Light-Emitting Diode, OLED), or the like. Further, the touchscreen 6031 may cover the display panel 6041. After detecting a touch operation on or near the touchscreen 6031, the touchscreen 6031 transmits the touch operation to the processor 607 to determine a type of a touch event, and then the processor 607 provides corresponding visual output on the display panel 6041 based on the type of the touch event.

In FIG. 6, the touchscreen 6031 and the display panel 6041 are used as two independent components to implement input and input functions of the mobile phone 60. However, in some embodiments, the touchscreen 6031 and the display panel 6041 may be integrated to implement the input and output functions of the mobile phone 400.

The sensor 605 may be a gravity sensor (gravity sensor) or a magnetic manometer. When the sensor 605 is the gravity sensor, the sensor 605 may detect an acceleration magnitude in each direction (generally three axes) of the mobile phone, may detect a magnitude and a direction of gravity when the sensor 605 is stationary, and may be applied to an application used for identifying a mobile phone posture (for example, screen switching between landscape and portrait modes, a related game, or magnetometer posture calibration), a function related to vibration identification (such as a pedometer or a knock), and the like. When the sensor 605 is the magnetic manometer, the sensor 605 may detect a geomagnetic field signal. Certainly, the mobile phone 60 may include a plurality of types of sensors. Only the sensor 605 is described herein and is not a limitation to a quantity and a type.

The mobile phone 60 may further include another sensor, such as a light sensor. Specifically, the light sensor may include an ambient light sensor and an optical proximity sensor.

The ambient light sensor may adjust luminance of the display panel 6041 based on brightness of ambient light, and the optical proximity sensor may detect whether an object approaches or touches the mobile phone, and may turn off the display panel 6041 and/or backlight when the mobile phone 60 approaches an ear. For other sensors such as a gyroscope, a barometer, a hygrometer, a thermometer, and an infrared sensor that may also be disposed on the mobile phone 60, details are not described herein.

The audio frequency circuit 606, a loudspeaker 6061, and a microphone 6062 may provide an audio interface between the user and the mobile phone 60. The audio frequency circuit 606 may transmit, to the loudspeaker 6061, an electrical signal converted from received audio data, and the loudspeaker 6061 converts the electrical signal into a sound signal for output. In addition, the microphone 6062 converts a collected sound signal into an electrical signal, and the audio frequency circuit 606 receives the electrical signal, converts the electrical signal into audio data, and outputs the audio data to the RF circuit 601 to send the audio data to, for example, another mobile phone, or outputs the audio data to the memory 602 for further processing.

The processor 607 is a control center of the mobile phone 60, uses various interfaces and lines to connect all parts of the entire mobile phone, and performs various functions and data processing of the mobile phone 60 by running or executing the software program and/or the module stored in the memory 602 and invoking data stored in the memory 602, so as to perform overall monitoring on the mobile phone. Optionally, the processor 607 may include one or more processing units. Preferably, an application processor and a modem processor may be integrated into the processor 607.

The application processor mainly processes an operating system, a user interface, an application program, and the like, and the modem processor mainly processes wireless communication. It may be understood that the modem processor may not be integrated into the processor 607.

The mobile phone 60 further includes the power supply 608 (such as a battery) that supplies power to each component. Preferably, the power supply may be logically connected to the processor 607 by using a power management system, so as to implement functions such as charging and discharging management and power consumption management by using the power management system.

In this embodiment of the present invention, the memory 602 has a same function as the memory 102 shown in FIG. 1, and the processor 607 has a same function as the processor 101 shown in FIG. 1.

Method or algorithm steps described in combination with the content disclosed in the present invention may be implemented by hardware, or may be implemented by a processor by executing a software instruction. The software instruction may include a corresponding software module. The software module may be stored in a RAM, a flash memory, a ROM, an erasable programmable read only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium and can write information into the storage medium. Certainly, the storage medium may be a part of the processor. The processor and the storage medium may be located in an ASIC. In addition, the ASIC may be located in a core network interface device. Certainly, the processor and the storage medium may exist in the core network interface device as discrete components.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer. It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A positioning cycle adjustment method, comprising:
obtaining, by a mobile device, N groups of environment record information in a current environment, each environment record information of the N groups of environment record information comprising an RSS of an environment signal, a receiving time of the environment signal, and an information source identifier of the environment signal in the current environment, and N being an integer greater than or equal to 2;
determining, by the mobile device, a location change rate value of the mobile device based on the N groups of environment record information, the location change rate value reflecting a location change distance of the mobile device per unit of time, and wherein determining the location change rate value of the mobile device comprises:

calculating, by using a quantity of information sources that generate the environment signal as a dimension of the environment record information and using the environment record information as a location point of the mobile device, a distance between location points of the mobile device that are corresponding to the N groups of environment record information, wherein calculating the distance between the location points of the mobile device comprises:

in response to N being greater than 2, calculating a first distance between location points of the mobile device that are corresponding to environment record information of the environment signal with an earliest receiving time and environment record information of the environment signal with a latest receiving time in the N groups of environment record information, and using the first distance as the distance between the location points of the mobile device that are corresponding to the N groups of environment record information; and dividing the distance between the location points of the mobile device by a receiving time difference between an environment signal with the earliest receiving time and an environment signal with the latest receiving time in the N groups of environment record information, to obtain the location change rate value of the mobile device; and adjusting, by the mobile device, a positioning cycle of the mobile device based on the location change rate value.

2. The method according to claim 1, wherein the environment signal comprises at least one of the following signals that are detected by the mobile device:

a cellular signal, a Wireless Fidelity (WiFi) signal, a Bluetooth signal, an optical signal, or a geomagnetic field signal.

3. The method according to claim 1, wherein before calculating the distance between the location points of the mobile device that are corresponding to the N groups of environment record information, the method further comprises:

in response to first environment record information comprising an RSS of an environment signal generated by a first information source, and second environment record information not comprising the RSS of the environment signal generated by the first information source, assigning, in the second environment record information, a predetermined value to the RSS of the environment signal generated by the first information source, the first environment record information and the second environment record information being two groups of environment record information that are used to calculate the distance in the N groups of environment record information.

4. The method according to claim 1, wherein the distance comprises any one of the following distances:

a Euclidean distance, a standardized Euclidean distance, a Manhattan distance, or a Chebyshev distance.

5. The method according to claim 1, wherein determining the location change rate value of the mobile device comprises:

extracting features of the N groups of environment record information, the feature being a value that can be identified by a training model, and the training model being used to obtain, based on an input feature of environment record information, a location change rate value corresponding to the input feature of the environment record information; and inputting the features of the N groups of environment record information into the training model, to obtain a location change rate value that is output by the training model, and using the location change rate value that is output by the training model as the location change rate value of the mobile device.

6. The method according to claim 1, wherein adjusting the positioning cycle of the mobile device comprises:

adjusting the positioning cycle of the mobile device to a positioning cycle corresponding to the location change rate value in a preset correspondence, the preset correspondence comprising at least one location change rate value and a positioning cycle that is in a one-to-one correspondence with the at least one location change rate value.

7. The method according to claim 1, wherein adjusting the positioning cycle of the mobile device comprises:

determining whether a difference between the location change rate value and a previous location change rate value of the mobile device is greater than or equal to a preset threshold; and adjusting, by the mobile device, the positioning cycle of the mobile device based on the location change rate value in response to the difference being greater than or equal to the preset threshold.

8. A positioning cycle adjustment method, comprising:

obtaining, by a mobile device, N groups of environment record information in a current environment, each environment record information of the N groups of environment record information comprising an RSS of an environment signal, a receiving time of the environment signal, and an information source identifier of the environment signal in the current environment, and N being an integer greater than or equal to 2;

determining, by the mobile device, a location change rate value of the mobile device based on obtained the N groups of environment record information, the location change rate value reflecting a location change distance of the mobile device per unit of time, and wherein determining the location change rate value of the mobile device comprises:

calculating, by using a quantity of information sources that generate the environment signal as a dimension of the environment record information and using the environment record information as a location point of the mobile device, a distance between location points of the mobile device that are corresponding to the N groups of environment record information, wherein calculating the distance between the location points of the mobile device that are corresponding to the N groups of environment record information comprises:

in response to N being greater than 2, separately calculating a first distance between location points of the mobile device that are corresponding to two groups of environment record information of two environment signals with adjacent receiving time in the N groups of environment record information, and averaging obtained Ni first distances to obtain the distance between the location points of the mobile device that are corresponding to the N groups of environment record information; and adjusting, by the mobile device, a positioning cycle of the mobile device based on the location change rate value.

9. A mobile device, comprising:
a non-transitory memory comprising instructions; and
a processor coupled to the non-transitory memory, the instructions being executed by the processor to cause the mobile device to be configured to:
   obtain N groups of environment record information in a current environment, wherein each environment record information of the N groups of environment record information comprises an RSS of an environment signal, a receiving time of the environment signal, and an information source identifier of the environment signal in the current environment, and wherein N is an integer greater than or equal to 2;
   determine a location change rate value of the mobile device based on obtained N groups of environment record information, wherein the location change rate value reflects a location change distance of the mobile device per unit of time, and wherein determining the location change rate value of the mobile device comprises:
   calculating, by using a quantity of information sources that generate the environment signal as a dimension of the environment record information and using the environment record information as a location point of the mobile device, a distance between location points of the mobile device that are corresponding to the N groups of environment record information, wherein calculating the distance between the location points of the mobile device comprises:
      in response to N being greater than 2, calculating a first distance between location points of the mobile device that are corresponding to environment record information of the environment signal with an earliest receiving time and environment record information of the environment signal with a latest receiving time in the N groups of environment record information, and using the first distance as the distance between the location points of the mobile device that are corresponding to the N groups of environment record information; and
   dividing the distance between the location points of the mobile device by a receiving time difference between an environment signal with the earliest receiving time and an environment signal with the latest receiving time in the N groups of environment record information, to obtain the location change rate value of the mobile device; and
   adjust a positioning cycle of the mobile device based on the location change rate value.

10. The mobile device of claim 9, wherein the environment signal comprises at least one of the following signals that are detected by the mobile device:
a cellular signal, a WiFi signal, a Bluetooth signal, an optical signal, or a geomagnetic field signal.

11. The mobile device of claim 9, wherein the instructions further cause the mobile device to:
   in response to first environment record information comprising an RSS of an environment signal generated by a first information source, and second environment record information not comprising the RSS of the environment signal generated by the first information source, assign, in the second environment record information, a predetermined value to the RSS of the environment signal generated by the first information source, wherein:
   the first environment record information and the second environment record information are two groups of environment record information that are used to calculate the distance in the N groups of environment record information.

12. The mobile device of claim 9, wherein the distance comprises any one of the following distances:
a Euclidean distance, a standardized Euclidean distance, a Manhattan distance, or a Chebyshev distance.

13. The mobile device of claim 9, wherein the instructions further cause the mobile device to:
   extract features of the N groups of environment record information, wherein the feature is a value that can be identified by a training model, and the training model is used to obtain, based on an input feature of environment record information, a location change rate value corresponding to the input feature of the environment record information; and
   input the features of the N groups of environment record information into the training model, to obtain a location change rate value that is output by the training model, and using the location change rate value that is output by the training model as the location change rate value of the mobile device.

14. The mobile device of claim 9, wherein the instructions further cause the mobile device to:
   adjust the positioning cycle of the mobile device to a positioning cycle corresponding to the location change rate value in a preset correspondence, wherein:
   the preset correspondence comprises at least one location change rate value and a positioning cycle that is in a one-to-one correspondence with the at least one location change rate value.

15. The mobile device of claim 9, wherein the instructions further cause the mobile device to:
   determine whether a difference between the location change rate value and a previous location change rate value of the mobile device is greater than or equal to a preset threshold; and
   adjust, by the mobile device, the positioning cycle of the mobile device based on the location change rate value in response to the difference is greater than or equal to the preset threshold.

* * * * *